D. K. NORTON.
Dogs for Saw-Mill Head-Blocks.

No. 151,613. Patented June 2, 1874.

Attest
Ph. S. Venter
Edgar J. Gross

Inventor
Durene K. Norton
By F. Millward
Attorney

UNITED STATES PATENT OFFICE.

DURENE K. NORTON, OF CINCINNATI, OHIO.

IMPROVEMENT IN DOGS FOR SAW-MILL HEAD-BLOCKS.

Specification forming part of Letters Patent No. 151,613, dated June 2, 1874; application filed May 1, 1874.

*To all whom it may concern:*

Be it known that I, DURENE K. NORTON, of Cincinnati, Hamilton county and State of Ohio, have invented a certain new and useful Improvement in Dogs for Saw-Mill Head-Blocks, of which the following is a specification:

My invention consists in so constructing and connecting the hinged dog with elevating and depressing devices, also of peculiar construction, that the dog is permitted to assume various angles in securing the log, and at the same time to preserve a connection free from slacking or play with the devices that elevate and depress it.

Figure 1:
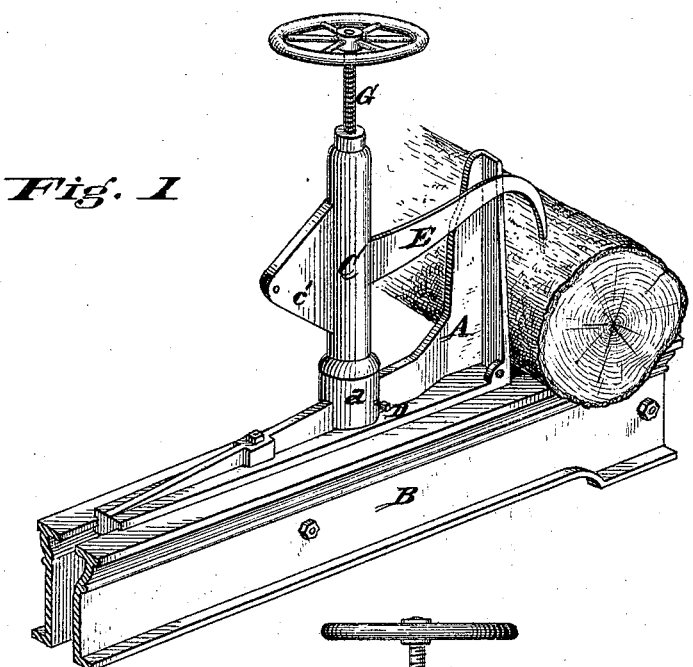
Figure 2:
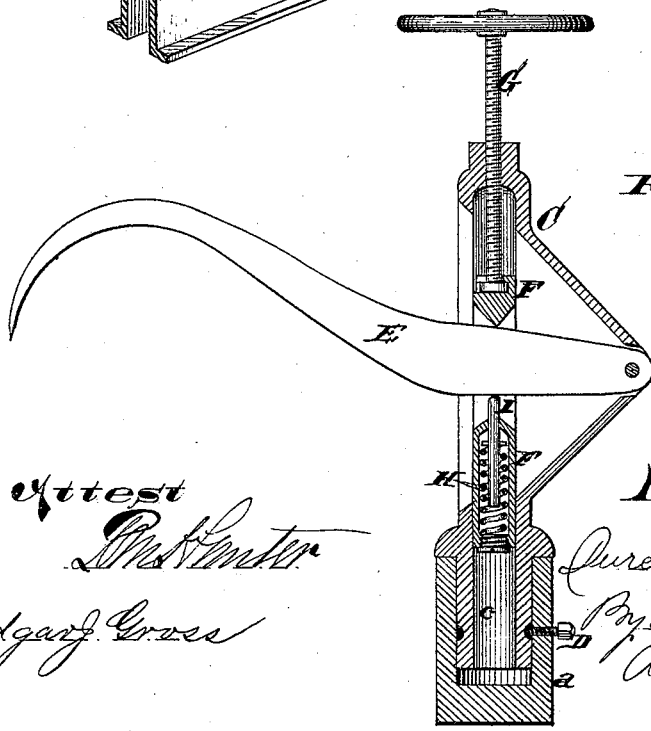

Figure 1 is a perspective view of a portion of a head-block with its knee and dog. Fig. 2 is a vertical section through the knee and dog.

A is the knee of the head-block B. This knee has a socket, $a$, formed upon it, for the reception of the round shank $c$ of the dog-post C, the shank having a circular groove, into which a set-screw, D, in the socket fits, the set-screw, while permitting the swiveling of the dog-post, serving to prevent its withdrawal. The dog-post has an angular box, C', formed upon it, to the outer end of which the dog E is pivoted, as shown. Within the dog-post a slide, F, is fitted, to move vertically, between the V-shaped jaws of which the dog E is located. This slide is elevated and depressed by the screw G, which has a swiveling connection with the top of the slide, as shown. The upper V of the slide has a continuous contact with the upper edge of the dog, and the pressure of the screw upon this upper V serves to force the dog into the log, in the manner shown in Fig. 1. The width between the V-shaped jaws of the slide F is sufficient to allow of the full range of angularity necessary for the dog; and in order to prevent shackling between the jaws of the slide in moving the dog, I provide, at the bottom of the slide F, a spring, H, which serves to force a pin, I, forcibly against the lower edge of the dog E, and thus keep said dog firmly against the upper jaw of the slide while the dog is being raised.

I claim—

In combination with the post C, hinged dog E, and operating-screw G, the slide F, fitted with spring H and bolt I, the parts being connected and operating substantially in the manner and for the purpose specified.

In testimony of which invention I hereunto set my hand.

DURENE K. NORTON.

Witnesses:
JEROME DU BOIS,
R. M. HUNTER.